Feb. 26, 1946.                H. M. STOLLER                2,395,517
              SPEED CONTROL SYSTEM FOR ELECTRIC MOTORS
                 Filed Nov. 21, 1942        2 Sheets-Sheet 1

INVENTOR
*H.M. STOLLER*
BY
ATTORNEY

Patented Feb. 26, 1946

2,395,517

UNITED STATES PATENT OFFICE 2,395,517

SPEED CONTROL SYSTEM FOR ELECTRIC MOTORS

Hugh M. Stoller, Mountain Lakes, N. J., assignor to Bell Telephone Laboratories, Incorporated, New York, N. Y., a corporation of New York Application November 21, 1942, Serial No. 466,509

23 Claims. (Cl. 171—312)

This invention relates to speed control systems, and more particularly to such systems including space discharge apparatus for controlling the speed of electric motors.

Heretofore, speed control systems embodying space discharge apparatus were known for the purpose of regulating a motor so as to maintain the speed thereof substantially constant. Certain prior art systems of the foregoing type were disclosed in my patents, Nos. 1,695,035 and 1,711,661, granted December 11, 1928, and May 7, 1929, respectively. Such speed regulating systems were useful in cases in which the factors of bulk and weight and effects of ambient temperature variations were of no special concern. The present invention is particularly applicable for use with electric motors whose physical locations, such as in the field of mobile apparatus, require that bulk and weight be kept down and that the effects of ambient temperature variations be reduced.

The present invention contemplates a speed control system of the electron discharge tube type in which precision and stability are improved over a predetermined range of variation of ambient temperature and in which weight and bulk are both reduced.

In a specific embodiment the present invention comprises an electric motor whose speed is to be controlled and which includes a regulating field winding, and a generator operated by the motor to produce a pilot alternating current whose frequency is proportional to the speed thereof. A frequency discriminating bridge comprising three physical arms, of which one is tuned to a certain frequency corresponding to the normal speed of the motor, has a pair of input terminals applied to the pilot wave generator and a pair of output terminals connected to the input of a phase detector tube whose output is also applied to the pilot wave generator and which embodies a resistor. This resistor is connected to the control grid of a power tube whose output includes the motor regulating field winding.

In the operation of the specific embodiment of the present invention, the pilot generator supplies pilot waves to the input terminals of the bridge at whose output terminals occurs an output wave having a magnitude and phase depending on the variation of the frequency of the pilot wave with reference to the certain frequency to which the one bridge arm is tuned. When the pilot wave has, in response to normal motor speed, the certain frequency, a balanced condition is established in the bridge and no output voltage occurs at its output terminals. This means that no adjustment of the amount of current flowing in the regulating field winding of the motor takes place.

When the frequency of the pilot wave is above normal, the bridge becomes unbalanced to produce an output voltage of one sign and when the pilot wave frequency is below normal the bridge becomes unbalanced in the opposite direction to produce an output voltage of opposite sign. The pilot wave is applied to the plate circuit of the detector tube while the bridge unbalance voltages are applied to the grid of this tube. When the two waves are in phase the effect is to make the grid voltage of the power more negative, thus weakening the regulation field; and when the two waves are opposite in sign the opposite effect is produced on the power tube, thus strengthening the regulation field. In this way speed regulation is effected.

A feature of the invention is a regeneration or feedback circuit extending between the phase detector and power tubes such that the current flowing in the motor regulating field winding also flows through a resistor which is included in the biasing circuit for the control grid of the phase detector tube. Hence, changes in the amount of current flowing in the motor regulating field winding are instantaneously reflected as corresponding changes in the effective biasing potential applied to the control grid of the phase detector tube so as to control further the amount of space current flowing in the latter tube. This provides for the motor a substantially flat speed versus primary variable characteristic.

Another feature is that as the resonant bridge arm is effectively a pure resistance at the certain frequency to which it is tuned, this resistance tends to undergo change of magnitude when subjected to the predetermined range of ambient temperature variation. The principal cause of such variation is the changes of the direct current resistance of the copper wire winding of the inductance embodied in the resonant bridge arm. This causes changes in the balanced or unbalanced condition of the bridge. To compensate such tendency, the bridge network includes in another arm a resistance network embodying a thermistor having a preselected temperature coefficient of resistance for the predetermined range of variation of ambient temperature. As a consequence, a predetermined ratio of resistance between the resonant and resistance arms is maintained substantially constant over the predetermined range of ambient temperature variation.

Another feature relates to the production of a transient output by the bridge network to exert a compensating effect on transient conditions in the system which transient conditions would tend to interfere with the regulation of speed. Still another feature relates to the use of a further resonant network to control the magnitude of the pilot voltage. Another feature concerns the use of the bridge output voltage to control the motor in proximity of the normal speed while the magnitude of the pilot wave provides the necessary control at the other speeds of the motor. As a consequence, no auxiliary starting device is required for the motor. An additional feature involves the control of the speed of the motor in synchronism with the fixed characteristic of an element unaffected by the operation of the motor whereby a substantial improvement in precision is obtained. Another feature concerns the use of a physical four-arm bridge in place of the physical three-arm bridge. A further feature relates to filter networks for attenuating harmonics of the pilot wave while at the same time compensating for the inherent phase characteristic of the frequency discriminating bridges.

The invention will be readily understood from the following description taken together with the accompanying drawings, in which.

The same reference numerals are employed to identify the same elements appearing in the several figures of the drawings.

Figures 1, 3:
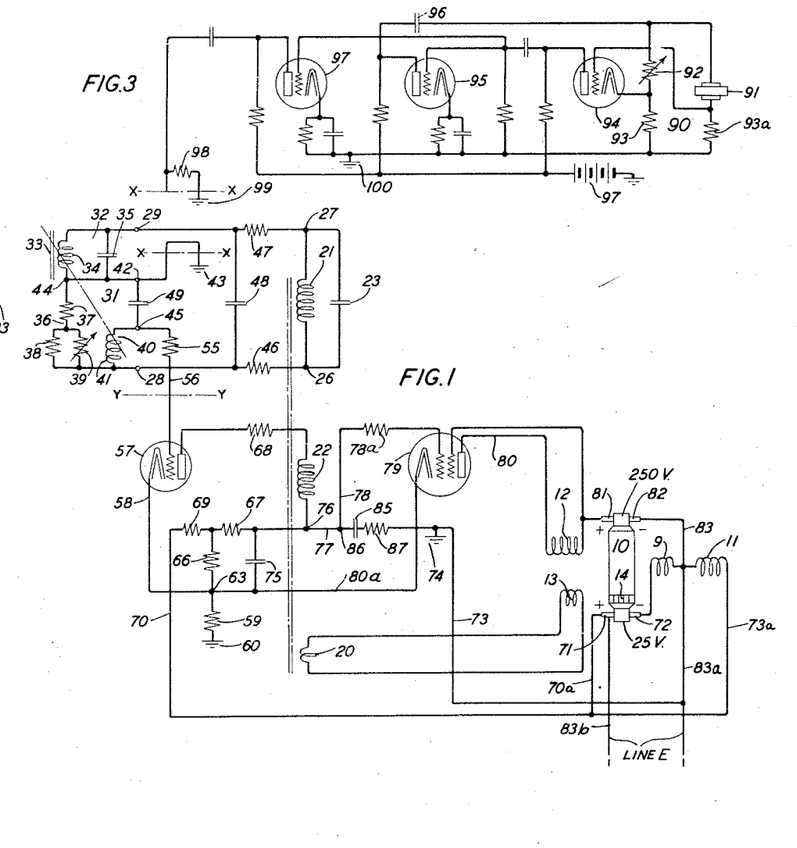
Fig. 1 is a schematic circuit diagram illustrating a specific embodiment of the invention.
Fig. 3 is a schematic circuit diagram of a crystal controlled oscillator for effecting synchronous regulation in Fig. 1.

Referring to Fig. 1, a dynamotor 10 embodies a series field winding 9, a shunt field winding 11, a regulating field winding 12, and a pilot winding 13. A toothed rotor 14 also embodied in the dynamotor 10 constitutes, together with the winding 13, a generator of a pilot alternating wave as disclosed in my copending application, Serial No. 450,037, filed July 7, 1942. The pilot generating winding 13 is connected to an electrical winding 20 which is inductively coupled to both electrical windings 21 and 22. A capacitor 23 is disposed across the winding 21 for a purpose that will be hereinafter pointed out.

A frequency discriminating bridge network 31 disclosed in my copending application, Serial No. 466,507, filed November 21, 1942 comprises a first arm 32 embodying a molybdenum-permalloy core 33 onto which is applied an electrical winding 34 to constitute an inductance coil which, together with a capacitor 35 connected in parallel therewith, constitutes a resonant circuit tuned to a certain frequency which will be hereinafter identified; a second arm 36 connected to the first arm 32 and provided with a resistance network comprising a fixed resistor 37 arranged in series with a fixed resistor 38 and a thermistor 39 disposed in parallel; and a third arm 40 comprising an electrical winding 41 applied to the core 33 and coupled inductively to the electrical winding 34 wound thereon. The fourth electrical arm of the bridge comprises the mutual inductance between the coupled windings 34 and 41.

Corresponding terminals of the bridge arms 36 and 40 constitute bridge terminal 28 which is extended through resistor 46 to the input winding terminal 26, and one terminal of the resonant bridge arm 32 constitutes bridge terminal 29 which is extended through resistor 47 to the input winding terminal 27. Across the bridge ends of these resistors is applied a capacitor 48. The output terminals of the bridge network 31 consist of one terminal 42 extended to both a ground point 43 and a point 44, which is common to a junction of both the respective first and second arms 32 and 36, and another terminal 45 applied to the free end of the bridge arm 40. The resistors 46 and 47, together with capacitor 48, and a capacitor 49 disposed across the bridge output terminals 42 and 45 and coupled with the internal resistance of the bridge network 31 constitute filter and phase changing networks.

The bridge network 31 has its output terminal 45 extended over a lead 56 embodying a resistor 55 to the control grid of a phase detector tube 57 whose cathode is connected over lead 58 and resistor 59 to a point 60 at ground potential. Thus, the input circuit of the phase detector tube 57 comprises ground point 43, bridge output terminal 42, capacitor 49, bridge output terminal 45, resistor 55, lead 56, control grid-cathode circuit of the phase detector tube 57, lead 58, resistor 59 and ground point 60. The output circuit of the phase detector tube 57 includes its anode-cathode circuit, lead 58, point 63, resistors 66 and 67 in series, electrical winding 22 coupled inductively to the pilot wave winding 20, resistor 68 and back to the anode of the phase detector tube 57. Resistor 69 has one terminal connected to the junction point of resistors 66 and 67 and its opposite terminal extended over leads 70 and 70a to (+) brush 71 engaging the 25-volt commutator of the dynamotor 10. A capacitor 75 is disposed across the serially connected resistors 66 and 67.

The 25-volt commutator has its (−) brush 72 extended through series winding 9 and over leads 83a and 73 to ground point 74. The primary line voltage of 25 volts is applied between lead 83b connected to the (+) brush 71 and lead 83a extended through series winding 9 to the (−) brush 72. The resistors 59, 66 and 69 constitute a potentiometer which supplies negative biasing voltage to the control grid of the detector tube 57. The effective negative biasing voltage impressed on the control grid of the detector tube 57 is the voltage produced across the cathode resistor 59 and comprises two portions: (a) the portion due to the current flow in the circuit comprising (+) dynamotor brush 71, leads 70a and 70, resistors 69, 66 and 59, ground points 60 and 74, leads 73 and 83a, series winding 9, and (−) dynamotor brush 72 to the 25-volt commutator of the dynamotor 10; and (b) the amount of space current flowing in a regenerative feedback circuit to be explained later herein. The shunt field winding 11 is extended over leads 73a and 70a to the (+) brush 71 engaging the 25-volt commutator of the dynamotor 10.

A point 76 applied to corresponding terminals of the resistor 67 and capacitor 75 in the output circuit of the phase detector tube 57 is extended over leads 77 and 78 and resistor 78a to the control grid of power tube 79 whose cathode is connected over lead 80a to the terminal 63 common to the input and output circuits of the phase detector tube 57. Thus, the voltage produced across resistors 66 and 67 is impressed on the control grid of the power tube 79 over the previously traced circuit. This voltage is smoothed out by the capacitor 75. As resistor 66 is of the order of 50 ohms compared with resistor 67 of the order of 250,000 ohms, the resistor 66 supplies, under the influence of the output circuit of tube 57, a negligible voltage to the control grid of tube 79. Hence, the voltage applied to the control grid of tube 79 and influenced by the output circuit of tube 57 will be hereinafter referred to as the voltage produced across the resistor 67. The anode of the power tube 79 is extended over lead 80; regulating field winding 12, (+) dynamotor brush 81, which is also applied to the screen grid of the power tube 79, 250-volt commutator of the dynamotor 10, (—) dynamotor brush 82, leads 83, 83a and 73 to the ground point 74. The potentiometer comprising resistors 59, 66 and 69, serves to apply a fixed positive biasing potential determined by the resistor 66 to the control grid of the power tube 79.

The regenerative feedback circuit mentioned above extends between the power tube 79 and phase detector tube 57 and comprises the anode-cathode of the power tube 79, lead 80a, point 63, resistor 59, ground points 60 and 74, leads 73, 83a and 83, brushes 82 and 81 engaging the 250-volt commutator of the dynamotor 10, regulating field winding 12, and lead 80 extended to the anode of the power tube 79. This circuit serves to vary the direct biasing voltage produced across the resistor 59 in response to changes occurring in the amount of current flowing in the regulating field winding 12 in a manner that will be hereinafter explained.

A capacitor 85 has one terminal connected to a junction point 86 of the leads 77 and 78 which connect the resistor 67 to the control grid of the power tube, and its opposite terminal joined to one end of a resistor 87 whose opposite terminal is extended to the ground point 74. The capacitor 85 and resistor 87 arranged in series constitute a damping network which functions to prevent hunting in the system of Fig. 1 thereby to establish certain amplification in the power tube 79 in the manner explained in the copending application, Serial No. 466,508, of E. R. Morton and H. M. Stoller filed November 21, 1942.

The operation of Fig. 1 will now be explained. When a pilot wave of the certain frequency to which the first bridge arm 32 is tuned is present in the windings 20 and 21 and is thereby applied across the bridge input terminals 28 and 29, a condition of balance is established in the bridge network 31 such that no alternating output wave is caused to occur across the bridge output terminals 42 and 45. When the pilot wave has a different frequency the bridge network 31 is unbalanced, and an alternating output wave is produced across the bridge output terminals 42 and 45. This output wave is approximately in phase with the pilot wave present in the windings 20 and 21 if the frequency of the pilot wave is lower than the frequency at which the bridge is balanced, and is approximately 180 degrees out of phase with reference to the pilot wave present in the windings 20 and 21 if the frequency of the pilot wave is higher than the frequency at which the bridge is balanced. Thus, as the frequency of the pilot wave supplied to the winding terminals 26 and 27 varies from above to below the certain frequency, or vice versa, the relative phases of the output waves produced across the bridge output terminals 42 and 45 vary through 180 degrees; and the magnitudes of such output waves vary in proportion to the departure of the frequency of the pilot wave from the certain frequency to which the resonant arm 32 is tuned.

The circuit of Fig. 1 is initially adjusted to operate so that at normal speed the pilot wave supplied to the coupled windings 20, 21 and 22 has a frequency which is equivalent to the resonant or certain frequency to which the first arm 32 is tuned. This means that no alternating output wave is established across the bridge output terminals 42 and 45, and consequently, no alternating voltage is impressed on the control grid of the phase detector tube 57. Further, this means that the fixed amounts of direct biasing voltage applied to the control grids of the phase detector tube 57 and the power tube 79 in the manner hereinbefore described cause a normal amount of current to flow in the regulating field winding 12 whereby the speed is regulated to the normal value. For the purpose of this illustration, it will be assumed that the frequency of the generated pilot wave is 720 cycles per second at a normal speed of 7200 revolutions per minute; the frequency of the generated pilot wave is proportional to speed; and the resonant bridge arm 32 is tuned to the frequency of 720 cycles per second.

Let it be assumed now that the speed tends to decrease below normal due, for example, to an increase in load or a decrease of line voltage. As a consequence, the frequency of the pilot wave present in the windings 20, 21 and 22 tends to decrease. The application of a portion of the pilot wave of the decreased frequency to the input of the frequency discriminating network 31 via the coupled windings 20 and 21 causes across its output terminals 42 and 45 the occurrence of an output wave whose magnitude is proportional to the extent that the frequency of the pilot is below 720 cycles per second and which is approximately in phase with the portion of the pilot wave present in the winding 21. This output wave is impressed on the control grid of the phase detector tube 57 over the above-identified input circuit therefor.

At the same time another portion of the pilot wave is supplied to the output circuit of the phase detector tube 57 via the coupled windings 20 and 22. As the portions of the pilot wave present in both windings 21 and 22 are in phase, then the phase of the wave impressed on the control grid of the phase detector tube 57 is in phase with the portion of the pilot wave of the decreased frequency impressed on the output circuit of the latter tube. Thus, the output wave supplied to the control grid of the phase detector tube 57 is positive when the wave supplied to the anode thereof is positive, and therefore the amount of space current flowing in the latter tube is caused to increase. This causes a corresponding increase in the magnitude of the direct voltage produced across the resistor 67 in the output of the phase detector tube 57. Hence, the direct biasing potential impressed on the control grid of the power tube 79 is rendered more negative. This occasions a decrease in the amount of space current flowing in the power tube 79, and thereby a corresponding decrease in the amount of current flowing in the regulation winding 12 of the dynamotor 10. This tends to restore the speed to normal.

Let it be assumed now that the speed tends to increase above normal due, for example, to a decrease in load or an increase of line voltage. As a consequence, the frequency of the pilot wave present in the windings 20, 21 and 22 tends to increase. The application of a portion of the pilot wave of the increased frequency to the input of the frequency discriminating network 31 via the coupled windings 20 and 21 will cause at its output terminals 42 and 45 the occurrence of an output wave whose magnitude is proportional to the extent that the frequency of the generated pilot wave is above 720 cycles per second, and which is approximately 180 degrees out of phase with reference to the portion of the pilot wave present in the winding 21. This output wave is impressed on the control grid of the phase detector tube 57 over the previously traced input circuit therefor.

At the same time another portion of the pilot wave is supplied to the output circuit of detector tube 57 via the coupled windings 20 and 22. As the portions of the pilot wave present in both windings 21 and 22 are in phase, then the phase of the output wave impressed on the control grid of the phase detector tube 57 is approximately 180 degrees out of phase, or leads in phase by approximately 180 degrees, with reference to the portion of the pilot wave impressed on the output circuit of the phase detector tube 57. Thus, the wave supplied to control grid of the phase detector tube 57 is negative when the wave supplied to the anode thereof is positive, and therefore the amount of space current flowing in the phase detector tube 57 is caused to decrease. This causes a corresponding decrease in the magnitude of the direct voltage produced across the resistor 67 in the output of the phase detector tube 57. Hence, the direct biasing potential impressed on the control grid of the power tube 79 is rendered less negative. This results in an increase in the amount of space current flowing in the power tube 79, and therefore a corresponding increase in the amount of current flowing in the regulating winding 12. This increase of field strength tends to restore the speed to normal.

As pointed out in my copending application relating to the frequency discriminating network 31, supra, the resistors 46 and 47, together with the capacitors 48 and 49, constitute filter and phase changing networks effectively operating as follows: (1) to attenuate harmonics of the pilot wave present in the windings 20, 21 and 22 such that one filter stage comprises resistors 46 and 47 coupled with capacitor 48, and another filter stage comprises capacitor 49 coupled with the internal resistance of the bridge 31; and (2) to provide a compensating phase shift of approximately 90 degrees between the input and output of the bridge 31 so as to offset the approximate 90-degree phase shift which is inherent in the bridge 31 as indicated by Equations 1 and 2 of my above-identified copending application relating to the frequency discriminating network 31. Thus, the output voltage effective across the output terminals 42 and 45 of the bridge 31 is rendered independent of both harmonics and the inherent phase characteristic of the bridge 31.

Resistor 68 disposed in the output circuit of the phase detector tube 57 limits the peak value of the current flowing therein and thereby renders ineffective the tendency of output circuit of the phase detector tube 57 to feedback current via the coupled windings 21 and 22, terminals 28 and 29 of the bridge 31, bridge 31 to the input circuit of the phase detector tube 57.

The bridge 31 embodying windings 34 and 41 on the common core 33 provides approximately twice the output over the well-known four-arm Wheatstone bridge which will be hereinafter discussed in connection with Fig. 4.

The regenerative feedback circuit extending between the phase detector tube 57 and the power tube 79 and including the cathode biasing resistor 59 for the phase detector tube 57 as hereinbefore identified provides feedback action between these tubes as follows: When the increased amount of current is caused to flow in the regulating field winding 12 in response to an increase in the speed as above explained, this increased amount of current also flows in the previously traced regenerative feedback circuit so as to return to the ground point 60 through the cathode biasing resistor 59. This increases correspondingly the magnitude of the potential produced across the cathode biasing resistor 59, and thereby increases the magnitude of the effective negative biasing potential applied to the control grid of the phase detector tube 57. This results in a further decrease in the amount of space current flowing in the output of the phase detector tube 57, and thereby a corresponding decrease in magnitude of the voltage produced across the resistor 67 whereby the control grid of the power tube 79 is rendered still less negative. This causes a proportionate increase in the amount of current flowing in regulating winding 12.

When a decreased speed causes a decrease of field current in regulating winding 12, this feedback circuit operates in the same manner to cause a proportionate further decrease in current in the regulating winding 12.

The result of the regenerative action is such that regardless of a relatively wide variation in the amount of current supplied to the regulating field winding 12 in response to changes in speed due to changes in line voltage and/or load as above described, an equilibrium speed is ultimately established at a value which is approximately equivalent to the normal speed. Thus, the regenerative action provides a speed characteristic which is substantially flat with reference to changes in the amount of current caused to flow in the regulating field winding due to changes in such primary variables as load, line voltage, or ambient temperature. In the absence of the regenerative action, such characteristic would embody a finite slope.

Figure 2:
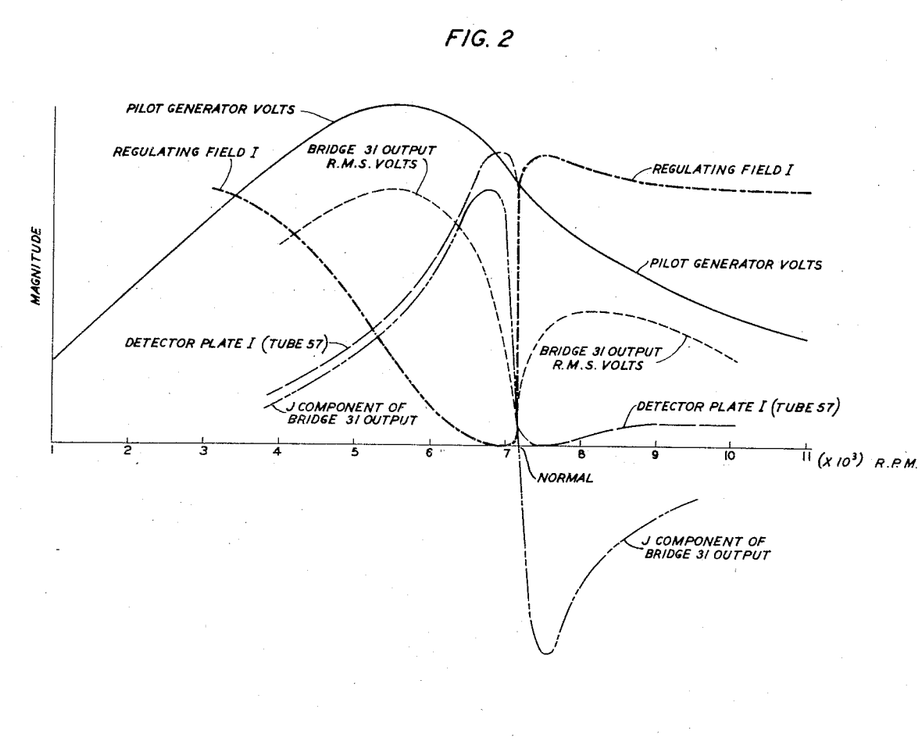
Fig. 2 is a family of curves illustrating certain action in Fig. 1.

Referring to Fig. 2, the above-described operation of the speed regulator circuit of Fig. 1 will be readily understood. The amount of current flowing in the regulating field winding 12 is relatively large up to half speed. This is desirable as a strong field gives good accelerating torque. From half speed to full speed the amount of current flowing in the regulating field winding 12 falls gradually to zero. This causes the dynamotor 10 to accelerate to the normal speed of 7200 revolutions per minute at which the amount of current flowing in the regulating field winding 12 rises substantially vertically to maximum, and remains approximately thereat regardless of further increases in the speed beyond 7200 revolutions per minute. This current serves to bring the speed back substantially to normal (7200 revolutions per minute) if for any reason the speed should increase thereover.

The amount of current flowing in the regulating field winding 12 depends upon the magnitude of the space current flowing in the output circuit of the phase detector tube 57, which latter current determines the magnitude of the voltage produced across the resistor 67, and thereby the effective biasing voltage impressed on the control grid of the power tube 79 as previously pointed out. Referring to Fig. 2, the amount of current flowing in the output circuit of the phase detector tube 57 is relatively small, below 4000 revolutions per minute; and attains a maximum in the range from 6800 to 7200 revolutons per minute; and falls substantially vertically to zero in the range from 7200 to 7500 revolutions per minute. For higher speeds, this current remains negligible.

The curve of detector plate current (tube 57) versus speed is due to both the bridge output (network 31) versus speed characteristic and the pilot generator output versus speed characteristic. Due to the fact that the internal inductance of the dynamotor is coupled through the transformer windings 20 and 21 with the capacitor 23, these elements constitute a low "Q" parallel tuned circuit which develops maximum pilot generator voltage at a dynamotor speed of the order of three-fourths normal (approximately 5400 revolutions per minute). Thereafter, this voltage gradually falls off. It will be noted in Fig. 2 that the bridge output voltage may be subdivided into an in-phase and a 90-degree or $j$ component. These are further discussed in my copending application relating to the frequency discriminating network 31, supra. At speeds extending approximately from 5500 to 8500 revolutions per minute, the bridge output voltage (bridge 31) furnishes the principal control of the speed. In this connection it will be further noted that the detector plate current (tube 57) follows substantially the $j$ component of the output voltage of the bridge 31, rather than the root mean square value of the latter voltage. The fact that the $j$ component is positive at speeds below 7200 revolutions per minute, then passes through zero substantially at the normal speed, and thereafter is negative at speeds above 7200 revolutions per minute provides the desired characteristic of the output current of the phase detector tube 57. The drooping speed voltage curve of the pilot generator cooperates with the bridge 31 in producing the desired characteristic of the output current of the phase detector tube 57. In the speed region above 8500 where the bridge output falls off rapidly the drooping generator voltage prevents the output current of detector tube 57 from rising. As a consequence the desired regulating field current characteristic, Fig. 2, is obtained so that the optimum field current is provided at all speeds over the entire range from starting to any overspeed condition.

The "Q" of the winding 34 on the core 33 is so proportioned that the bridge 31 is most effective over a speed range equivalent to ±20 per cent of the frequency of the generated pilot wave as mentioned in my copending application relating to the frequency discriminating network 31, supra. Due to the speed control exercised by the effects of the generated pilot wave voltage and the $j$ component of the output voltage of the bridge 31, the circuit of Fig. 1 does not require an auxiliary starting arrangement for the dynamotor. It has been found that despite the stalling of the dynamotor, or purposely running the latter above normal speed, the regulator of Fig. 1 serves to cause the dynamotor to quickly return to the normal speed.

In a particular case, with a normal speed of 7200 revolutions per minute, the actual speed was held within ±2 revolutions per minute over a range of variation of line voltage from 20 to 30 volts and/or no load to full load. In this connection, it is noted that the action of the regenerative feedback circuit is substantially instantaneous for the reason that the circuit of Fig. 1 embodies no time delay as previously pointed out. As the absence of time delay normally tends to cause hunting, or the oscillation of the circuit of Fig. 1 about the normal speed, such hunting action is obviated due to a stabilizing influence of the bridge network 31, which stabilizing action will now be explained with reference to the effect of transients on the speed.

Under the influence of a sudden change in line voltage or mechanical load, the bridge network 31 yields a transient output voltage as explained in my copending application relating to the frequency discriminating network 31, supra. This transient output voltage is superposed on the steady state output voltage hereinbefore described. Let it be supposed that a sudden increase occurs in the load. For the purpose of distinguishing between transient and steady state or normal phenomena, let it be further supposed that the increased load causes no permanent change in the speed since the regenerative feedback action described hereinbefore functions to bring the speed back substantially to normal and that the only effect of the increased load is to cause a dropping back in phase of the armature in a manner similar to the dropping back in phase of the armature of a standard type of synchronous alternating current motor. As a result of this supposition, the bridge 31 is balanced both at the conditions of the original and increased loads. In the interim, however, between such balancing of the bridge network 31, a transient output is supplied to the bridge output terminals 42 and 45. This transient output is due to the fact that the resonant arm 32 of the bridge network 31 contains electrically stored energy in the form of $1/2\ LI^2 + 1/2\ CE^2$; where L is the inductance of the winding 34, I is the current in amperes in the winding 34, C is the capacity of the capacitor 35, and E is the voltage across the resonant arm 32.

This transient output will be maintained for a time interval equivalent approximately to the time of 4 or 5 cycles (with a coil having a "Q" of the order of 20). The transient output wave will be approximately in phase with reference to the pilot wave present in the winding 22. Hence, the waves applied simultaneously to the input and output of the phase detector tube 57 will also be in phase. Consequently, the transient output wave serves to substantially increase the amount of space current flowing in the output circuits of the phase detector tube 57 and power tube 79, at the start of the sudden change of the line voltage or load. This effect is of value in overcoming the unavoidable lag due to the time constant $$\frac{1}{CR}$$

of the coupling resistors 66 and 67 and the shunting condenser 75. It has been found desirable to make $$\frac{1}{CR}$$

of the same order as $$\frac{r}{L}$$

where $r$ and $L$ are the respective resistance and inductance of winding 34.

The control circuit of Fig. 1 does not wait until the speed has fallen to begin corrective action, but delivers a substantial counteracting torque through the change in amount of current flowing in the regulating field winding 12 at the instant the change occurs in the line voltage or load. The transient output may have an initial amplitude which is several times larger than the maximum amplitude of the steady state output wave of the bridge network 31, but the transient output dissipates itself after the time interval equivalent approximately to the time interval of 4 or 5 cycles thereof, leaving only the steady state output, if any, at the bridge output terminals 42 and 45 for controlling the speed in response to slow changes in line voltage and load as hereinbefore pointed out. As a consequence, the regulator circuit of Fig. 1 will compensate for both sudden and slow changes in load and/or line voltage and provide flat regulation and a high degree of stability.

Let it be supposed that a sudden decrease occurs in the load. As in the case of the increase in load, the bridge 31 is balanced at the conditions of the initial and decreased loads; and the only effect of the decreased load is an advance in phase of the armature. In the interim, however, a transient output is supplied to the bridge output terminals 42 and 45. This is again due to the stored energy in the resonant arm 32 of the bridge 31 as above explained. This transient, as in the case of the previous transient, will exist for a few cycles. The transient output will be substantially 180 degrees out of phase with the pilot wave present in the winding 22. Hence, the waves applied simultaneously to the input and output of the phase detector tube 57 will be substantially 180 degrees out of phase. Consequently, the transient output wave serves to decrease the amount of space current flowing in the phase detector tube 57 and increase the current in power tube 79 substantially in an instantaneous manner, and thereby the amount of current flowing in the regulating field winding 12 as above described.

As the bridge arm 32 is essentially a pure resistance at its resonant frequency of 720 cycles per second, its effective resonance resistance may tend to vary with changes of ambient temperature. This would tend to cause the bridge 31 to show an output voltage although the pilot wave being supplied thereto had a frequency of 720 cycles per second. Such resistance variation of the bridge arm 32 is compensated for by the bridge arm 36 which includes the thermistor 39 provided with the proper negative temperature coefficient of resistance and whose effective resistance varies in a sense to counteract the changes of the resonance resistance of the bridge arm 32 over a range of +40° C. to +140° C. variation of ambient temperature, for example, as pointed out in my copending application relating to the frequency discriminating bridge 31, supra. As a consequence of this compensation, a predetermined ratio of the order of 1 to 1 for the purpose of the present illustration, between the effective resistance of the bridge arms 32 and 36 is maintained substantially constant over the range of ambient temperature variation extending from +40° C. to +140° C.; and any tendency for a voltage to appear at the output terminals 42 and 45 of the bridge 31 in response only to the effect of such range of ambient temperature variation on the bridge arm 32 is substantially obviated.

The arrangement of Fig. 1 embodies an improvement of the order of 5 to 1 over prior speed regulators of the types disclosed in my two patents, supra, in the respects of both precision and stability. In other words, the system of Fig. 1 provides a regulation of speed of the order of one-quarter of 1 per cent with the tubes 57 and 79 being of the commercial type. This regulation can be improved to one-tenth of 1 per cent over the same range of voltage, load and temperature variation but using specially selected tubes 57 and 79. At the same time the weight and space occupied by the prior regulators have been so reduced that, for example, the equipment of the present invention weighs approximately 1.5 pounds as compared to 70 pounds for the prior regulators according to my two patents, supra; the space occupied by the present invention is one-twentieth of a cubic foot as compared to two cubic feet of the prior regulators in accordance with my two patents, supra; and the cost is substantially reduced.

A crystal controlled oscillator of the type shown in Fig. 3 may be employed to introduce into the input of the phase detector tube 57 a voltage fixed as to both frequency and magnitude. In this connection it is understood that the circuit portion shown above the line X—X in Fig. 3 is to be substituted for the circuit portion shown above the line X—X of Fig. 1. Fig. 3 is an oscillator circuit of the crystal controlled type, and comprises a resistance bridge 90 in which a crystal 91 is disposed in one arm, a thermistor 92 with the proper temperature coefficient of resistance is located in a second arm, and individual resistors 93 and 93a of fixed resistance characteristic are interposed in each of the remaining two arms. Space discharge tubes 94 and 95 are amplifiers. One diagonal of the bridge 90 is supplied from the output of the tube 95 through a capacitor 96 which blocks the direct voltage impressed on the anodes of both the tubes 94 and 95 from source 97 of direct voltage. The input to the grid circuit of the tube 94 is obtained from the other diagonal of the bridge 90.

As the output current of the tube 95 is gradually built up to a certain level, the thermistor 92 is also gradually heating up at the same time whereby the bridge 90 is gradually brought into a balanced condition. As this is being done, the input to the tube 94 is being gradually reduced. Ultimately, the level of the output current in the tube 95 is stabilized at a predetermined value. This output is applied to a buffer amplifier 97a whose output circuit includes resistor 98 and ground points 99 and 100. The voltage developed across the resistor 98 is introduced in the input circuit of the phase detector tube 57 in series with the bridge output terminals 42 and 45.

The frequency of the oscillator in Fig. 3 is fixed at 720 cycles per second, which frequency corresponds to the normal frequency of the pilot generator (winding 13 and rotor 14 of the dynamotor 10) as above mentioned; and the magnitude of the voltage produced across the resistor 98 is fixed at a predetermined value. According to Figs. 1 and 3, the effective voltages applied to the control grid of the phase detector tube 57 may be added in series as follows: (a) direct current bias voltage across resistor 59 in Fig. 1; (b) output voltage of the bridge 31 as represented by the charge on capacitor 49 applied across its output terminals 42 and 45; and voltage produced across the resistor 98 in Fig. 3.

In the operation of Figs. 1 and 3, the voltage across the resistor 98, Fig. 3, exerts on the average a negligible effect at all speeds, except the assumed synchronous speed of 7200 revolutions per minute. Thus, the dynamotor is started and brought up to the synchronous speed in the manner explained above in connection with Fig. 1. When the synchronous speed is attained, the regulator of Fig. 1 is locked in with the standard wave supplied by the crystal oscillator, Fig. 3. At the synchronous speed, the pilot wave assumes a phase angle $\theta$ with reference to the standard wave, which angle is about 90 degrees. An increase in the load or a decrease in the line voltage causes a momentary decrease in the speed whereby the angle $\theta$ is decreased. This tends to bring the pilot wave more nearly into phase with the standard wave whereby the output current of the phase detector tube 57 is increased so as to decrease the amount of current flowing in the regulating field winding 12 to prevent a further decrease in the speed as above described. The compensating resistor 59 in combination with the damping network comprising capacitor 86 and resistor 87 restores the amplification of the power tube 79 to the new steady state condition, so that the angle $\theta$ resumes substantially its initial value of approximately 90 degrees. The action of this damping network is explained in detail in the copending application of E. R. Morton et al., supra.

During the time interval when the angle $\theta$ is decreasing, the instantaneous frequency of the pilot wave is less than the frequency of the standard wave by an amount $$\frac{\Delta\omega}{\omega_0}$$

which amount is proportional to $$\frac{d\theta}{dt}$$

or the slope of the angle $\theta$. Referring to Equation 2 of my copending application relating to the frequency discriminating network 31, supra, it will be noted that, when the frequency of the pilot wave is below the certain frequency $f_0$ (720 cycles per second), the bridge 31 delivers to its output terminals 42 and 45 an output voltage $$E_{2-3} = E_0 q \frac{\Delta\omega}{\omega_0} \cos \omega t$$

which voltage is approximately in phase with the pilot voltage present in the winding 22 and applied to the output current of the phase detector tube 57. This, as previously pointed out, causes a decrease in the amount of current flowing in the regulating field winding 12 whereby the tendency for the speed to change is compensated. Thus, the action of the bridge 31 is in such sense as to oppose a decrease in the angle $\theta$, and thereby tends to stabilize further the regulator of Figs. 1 and 3.

A momentary decrease in the load or an increase in the line voltage, tends to cause an increase in the speed whereby the angle $\theta$ is increased. This tends to move the pilot wave further out of phase with reference to the standard wave whereby the output current of the phase detector tube 57 is decreased so as to increase the amount of current flowing in the regulating field winding 12 to prevent a further increase in the speed in the manner mentioned hereinbefore. The compensating resistor 59 and the network comprising capacitor 86 and resistor 87 restore the certain amplification of the power tube 79 to the new steady condition, and the angle $\theta$ returns substantially to its initial value of approximately 90 degrees.

During the interval when the angle $\theta$ is increasing, the opposite effect takes place.

I have found it advantageous to use a quartz crystal in the oscillator producing the standard wave, Fig. 3. By using a crystal of the flexure type in the audio frequency range of 720 cycles per second, the frequency of the standard oscillator can be made to match the slot frequency of the dynamotor 10. Such a crystal is physically small, mechanically permanent, and most precise as to frequency. By enveloping such crystal in a thermostatically controlled enclosure, precision of the order of three parts in a million is obtainable with the combined circuits of Figs. 1 and 3; and omitting the thermostatically controlled enclosure in the combined circuits of Figs. 1 and 3, precision of the order of one part in ten thousand, or 0.01 per cent, is obtainable with an ambient temperature variation of 50° C. over the range above specified.

Figure 4:
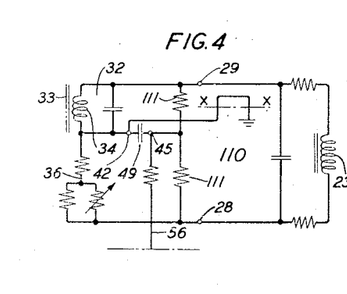
Fig. 4 is a schematic circuit diagram of a Wheatstone bridge which may be utilized in Fig. 1.

Fig. 4 shows a Wheatstone bridge 110 embodying four physical arms which may be substituted in Fig. 1 for the bridge 31 embodying three physical arms. In this connection it is understood that the circuit portion shown above the line Y—Y in Fig. 4 is to be substituted for the circuit portion shown above the line Y—Y in Fig. 3; and further that the synchronous operation effected by use of the crystal controlled oscillator of Fig. 3 may be accomplished with Figs. 1 and 4 by the proper substitution of Fig. 3 in Fig. 4 with respect to the line X—X. The bridge 110 embodies the resonant arm 32 and the resistive arm 36, and, for purpose of simplicity, two other arms which are substantially equal resistors 111. It is understood that the lower right arm 111 in Fig. 4 could also be an electrical winding applied to the core 33 and coupled to the winding 34 as shown in the bridge 31, Fig. 1. The operation of the bridge 110, Fig. 4, is substantially the same as that of bridge 31, Fig. 1, except that it has reduced sensitivity with reference to the latter bridge.

What is claimed is:

1. A speed regulator for an electric motor, comprising means to generate an alternating wave whose frequency is proportional to the speed of said motor, a bridge having a resonant arm tuned to the frequency corresponding to the normal motor speed and further having its input diagonal applied to said wave generating means, a speed governing circuit comprising circuit means operating in response to the unbalance wave effective at the bridge output diagonal and the generated wave to cause a correction in the motor speed, and means comprising said resonant arm to supply transient electrical energy to said speed governing circuit in response to a sudden shift in the phase of the generated wave, said speed governing circuit operating in response to said transient energy and the generated wave to cause a further correction in the motor speed.

2. The speed regulator according to claim 1 in which said bridge is a Wheatstone bridge comprising four physical arms including said resonant arm and three other arms.

3. The speed regulator according to claim 1 in which said bridge comprises three physical arms including said resonant arm and two other arms, said resonant arm comprising a magnetic core, an electrical winding applied to said core and a capacitor connected to said winding, one of said two other arms being a further electrical winding applied to said core and coupled inductively to said winding of said first arm.

4. A speed regulator for an electric motor including a regulating field winding, comprising means to generate an alternating wave whose frequency is proportional to the speed of said motor, a bridge having a resonant arm tuned to the frequency corresponding to normal motor speed and further having two pairs of conjugate terminals of which one pair is applied to said wave generating means, a speed governing circuit comprising a phase detector tube having its input circuit effectively connected to the other pair of said terminals and its output circuit applied to said wave generating means, and a power tube having its control grid effectively connected to the output circuit of said phase detector tube and its output circuit embodying said motor field winding, said speed governing circuit operating in response to bridge unbalance voltage to effect a correction in motor speed, and means comprising said resonant arm to supply transient electrical energy to the input circuit of said phase detector tube in response to a sudden shift in the phase of the generated wave, said speed governing circuit operating in response to said transient energy to exert a compensating effect on the motor speed.

5. The speed regulator according to claim 4 which includes a regenerative circuit extending between said phase detector and power tubes to provide said motor substantially with a flat characteristic comprising speed versus primary variable.

6. A speed regulator for an electric motor including a regulating field winding, comprising means to generate an alternating wave whose frequency is proportional to the speed of said motor, a bridge having a resonant arm tuned to the frequency corresponding to normal motor speed and further having two pairs of conjugate terminals of which one pair is applied to said wave generating means, a phase detector tube having its input circuit connected effectively to the other pair of said terminals and its output circuit applied to said wave generating means, a power tube having its control grid connected effectively to the output circuit of said phase detector tube and its output circuit arranged to include said regulating field winding, and means comprising an independent source to introduce in the input circuit of said phase detector tube an alternating wave having a predetermined magnitude and a fixed frequency equivalent to the frequency corresponding to the normal motor speed whereby a synchronous relation is maintained between the frequency of the generated wave and the fixed frequency of the independent wave.

7. A speed regulator for an electric motor including a regulating field winding, comprising means to generate an alternating wave whose frequency is proportional to the speed of said motor, a bridge having a resonant arm tuned to the frequency corresponding to normal motor speed and further having two pairs of conjugate terminals of which one pair is applied to said wave generating means, a speed governing circuit comprising a phase detector tube having its input circuit effectively connected to the other pair of said terminals and its output circuit applied to said wave generating means, and a power tube having its control grid connected effectively to the output circuit of said phase detector tube and its output circuit arranged to include said regulating field winding, said speed governing means operating in response to bridge unbalance voltage to effect correction in motor speed, means comprising an independent source to introduce in the input circuit of said phase detector tube an alternating wave having a predetermined magnitude and a fixed frequency equivalent to the frequency corresponding to the normal motor speed whereby a synchronous relation is maintained between the frequency of the generated wave and the fixed frequency of the independent wave, and means comprising said resonant arm to supply a transient alternating wave to said other pair of bridge output terminals and thereby to the input circuit of said phase detector tube in response to a sudden shift in the phase of the generated wave, said speed governing means operating in response to said transient wave and said generated wave to effect a further correction in the motor speed.

8. A speed regulator for an electric motor including a regulating field winding, comprising means to generate an alternating wave whose frequency is proportional to the speed of said motor, a bridge network having a resonant arm tuned to a certain frequency corresponding to normal motor speed so that said resonant arm is effectively a resistance at the certain frequency, said resonant arm tending to change the value of its effective resistance over a certain range of variation of ambient temperature, said bridge network further having a resistance arm connected to said resonant arm and including a thermoresponsive element provided with a preselected temperature coefficient of resistance such that the effective resistance of said resistance arm varies in such sense as to compensate for the changes of the effective resistance of said resonant arm whereby a predetermined ratio between the effective resistances of said resonant and resistance arms is maintained substantially constant over the certain range of ambient temperature variation, said bridge network also having two pairs of conjugate terminals of which one pair is applied to said wave generating means, a phase detector tube having its input circuit connected to the other of said terminal pairs and its output circuit applied to said wave generating means, and a power tube having its control grid connected to the output circuit of said phase detector tube and its output circuit embodying said motor field winding.

9. A speed regulator for an electric motor including a regulating field winding, comprising means to generate an alternating wave whose frequency is proportional to the speed of said motor, a bridge network having a resonant arm tuned to a certain frequency corresponding to normal motor speed so that said resonant arm is effectively a resistance at the certain frequency, said resonant arm tending to change the value of its effective resistance over a certain range of variation of ambient temperature, said bridge network further having a resistance arm connected to said resonant arm and including a thermoresponsive element provided with a preselected temperature coefficient of resistance such that the effective resistance of said resistance arm varies in such sense as to compensate for the changes of the effective resistance of said resonant arm whereby a predetermined ratio between the effective resistances of said resonant and resistance arms is maintained substantially constant over the certain range of ambient temperature variation, said bridge network also having two pairs of conjugate terminals of which one pair is applied to said wave generating means, a speed governing circuit comprising a phase detector tube having its input circuit connected to the other of said terminal pairs and its output circuit applied to said wave generating means, and a power tube having its control grid connected to the output circuit of said phase detector tube and its output circuit embodying said motor field winding, said speed governing circuit operating in response to bridge unbalance voltage to effect a correction in motor speed, and means comprising said resonant arm to introduce a transient alternating wave in series with the other of said terminal pairs and thereby in the input circuit of said phase detector tube when a sudden phase shift occurs in the generated wave, said speed governing circuit operating in response to said transient wave and said generated wave to effect a further correction in the motor speed.

10. A speed regulator for an electric motor including a regulating field winding, comprising means to generate an alternating wave whose frequency is proportional to the speed of said motor, a bridge network having a resonant arm tuned to a certain frequency corresponding to normal motor speed so that said resonant arm is effectively a resistance at the certain frequency, said resonant arm tending to change the magnitude of its effective resonance resistance over a certain range of variation of ambient temperature, said bridge network further having a resistance arm connected to said resonant arm and including a thermoresponsive element provided with a preselected temperature coefficient of resistance such that the effective resistance of said resistance arm varies in such sense as to compensate for the changes of effective resonance resistance of said resonant arm over the certain range of ambient temperature variation, said bridge network also having two pairs of conjugate terminals of which one pair is applied to said wave generating means, a phase detector tube having its input circuit connected to the other pair of said terminals and its output circuit applied to said wave generating means, a power tube having its control grid applied to the output circuit of said phase detector tube and its output circuit embodying said regulating field winding, and means including an independent source to introduce in the input circuit of said phase detector tube in series with said other terminal pair an alternating wave whose frequency is fixed and equivalent to the frequency corresponding to the normal motor speed whereby a synchronous relation is maintained between the frequency of the generated wave and the fixed frequency of the independent wave.

11. A speed regulator for dynamo-electric apparatus, comprising means to generate a pilot alternating wave whose frequency is proportional to the speed of said apparatus, a network comprising three physical arms of which a first arm embodies a magnetic core, an electrical winding applied to said core and a capacitor such that said winding and capacitor constitute a circuit resonant at a certain frequency corresponding to a normal apparatus speed, a second arm embodies a resistive network, a third arm embodies a further electrical winding applied to said core and coupled inductively to said winding, and conjugate pairs of input and output terminals of which said input terminal pair is applied to said generating means, and speed regulating means connected to said output terminal pair and operating in response to an unbalance voltage, effected at said output terminal pair when the frequency of the pilot wave varies from the certain frequency, to cause a correction in the motor speed.

12. A speed regulator for dynamo-electric apparatus, comprising means to generate an alternating wave whose frequency is proportional to the speed of said apparatus, a bridge comprising three physical arms of which a first arm embodies a magnetic core, an electrical winding applied to said core and a capacitor such that said winding and capacitor constitute a circuit resonant at a certain frequency corresponding to normal apparatus speed, a second arm embodies a resistive network, a third arm embodies a further electrical winding applied to said core and coupled inductively to said winding, and conjugate pairs of input and output terminals of which the input terminal pair is applied to said generating means, space discharge means having its input circuit connected to said output terminal pair and its output circuit applied to said generating means, further space discharge means having its control electrode connected to the output circuit of said space discharge means, a regulating field winding for said apparatus connected in the output circuit of said further space discharge means, and feedback means extending between both said space discharge means to provide said apparatus with a substantially flat characteristic comprising speed versus primary variable.

13. In combination in a speed regulator system, dynamo-electric apparatus having a field winding to regulate the speed thereof, a generator to produce a pilot wave whose frequency is proportional to the speed of said apparatus, a frequency discriminating bridge having in one arm a magnetic core, an electrical winding on said core, and a capacitor, said one arm constituting a resonant circuit tuned to a certain frequency corresponding to the normal speed of said apparatus, said bridge further having conjugate pairs of input and output terminals of which the input terminal pair is applied to said generator, said bridge providing substantially no alternating wave at its output terminal pair when the frequency of the pilot wave is substantially equivalent to the certain frequency and further providing an alternating wave of varying phase at its output terminal pair when the frequency of the pilot wave varies with reference to the certain frequency, a phase detector tube having its input circuit applied to said bridge output terminal pair and its output circuit applied to said generator so that the phase relation between the waves applied simultaneously to its input and output circuits determines the amount of space current flowing in its output circuit, a power tube having its control electrode applied to the output circuit of said phase detector tube and its output circuit arranged to include said regulating field winding so that the changes in the amount of current flowing in said latter winding are responsive to the changes in the amount of current flowing in the output circuit of said phase detector tube, and feedback means extending between both said phase detector and power tubes and responsive to changes in the amount of current flowing in said regulating field winding to provide said apparatus with a substantially flat characteristic comprising speed versus current in said regulating field winding.

14. The combination according to claim 13 in which said one arm introduces a transient alternating wave across the bridge output terminal pair and thereby into the input circuit of said phase detector tube in response to the occurrence in said system of a transient condition which so affects said generator as to change suddenly the phase of the pilot wave produced thereby, the phase relation between the transient and pilot waves present simultaneously in the input and output circuits of said phase detector tube serving to control further the amount of space current flowing in the output circuit of said phase detector tube.

15. The combination according to claim 13 in which the output circuit of said phase detector tube includes a resistor and a further capacitor in parallel for supplying filtered biasing voltage to the control grid of said power tube, the time constants of $$\frac{r}{L} \text{ and } \frac{1}{CR}$$

being of the same order of magnitude so that substantially no time delay intervenes between phase changes in the pilot wave and changes in the amount of current flowing in said regulating field winding, where $r$ is the resistance value of said winding of said one arm, L is the inductance value of said winding of said one arm, C is the capacitance value of said capacitor, and R is resistance value of said resistor.

16. The combination according to claim 13 which includes means disposed in the output circuit of said phase detector tube to control the peak magnitude of the space current flowing therein and thereby the magnitude of the current flowing in an effective feedback circuit comprising the output circuit of said phase detector tube, said wave generating means, said bridge, and the input circuit of said phase detector tube such that substantially no current flows in said effective feedback circuit.

17. The combination according to claim 13 in which a further resonant circuit, comprising a further capacitor and the internal inductance of said generator tuned to a preselected frequency corresponding to an apparatus speed which is less than the normal apparatus speed, is interposed between said generator and the bridge input terminal pair to control the magnitude of the pilot wave supplied simultaneously to the latter terminal pair and the output circuit of said phase detector tube.

18. The combination according to claim 13 in which said bridge possesses an inherent phase characteristic and in which a network is effectively applied to both the bridge input and output terminal pairs to attenuate harmonics of the pilot wave and further to compensate for said inherent phase characteristic of said bridge so that when the frequency of the pilot wave is above the certain frequency the waves supplied simultaneously to the input and output circuits of said phase detector tube are approximately 180 degrees out of phase and so that when the frequency of the pilot wave is below the certain frequency the waves supplied simultaneously to the input and output circuits of said phase detector tubes are approximately in phase.

19. The combination according to claim 13 in which the "Q" of the inductance comprising said core and winding thereon of said one arm is so proportioned that said bridge is effective over a frequency range equivalent substantially to ±20 per cent of the certain frequency to which said one arm is tuned.

20. In combination in a speed regulator system, dynamo-electric apparatus having a field winding to regulate the speed thereof, a generator to produce a pilot wave whose frequency is proportional to the speed of said apparatus, a frequency discriminating bridge having in a first arm a magnetic core, an electrical winding on said core, and a capacitor, said first arm constituting a resonant circuit tuned to a certain frequency corresponding to the normal speed of said apparatus, said resonant circuit tending to change is effective direct current resistance in response to variation in ambient temperature whereby the bridge balance at the certain frequency is correspondingly changed, said bridge having in a second arm a resistive network including a thermoresponsive element provided with a preselected temperature coefficient of resistance so that the effective resistance of said second arm varies in such sense as to compensate for the change in the effective resistance of said first arm whereby said firm arm remains substantially tuned to the certain frequency over a certain range of variation of ambient temperature, said bridge having in a third arm a further electrical winding applied to said core and coupled inductively with said winding and further having conjugate pairs of input and output terminals of which the input terminal pair is applied to said generator, said bridge providing substantially no alternating wave at its output terminal pair when the frequency of the pilot wave is substantially equivalent to the certain frequency and further providing an alternating current of varying phase at its output terminal pair when the frequency of the pilot wave varies with reference to the certain frequency, a phase detector tube having its input circuit applied to the bridge output terminal pair and its output circuit applied to said generator so that the phase relation between the waves applied simultaneously to its input and output circuits determines the amount of space current flowing in its output circuit, a power tube having its control electrode applied effectively to the output circuit of said phase detector tube and its output circuit arranged to include said regulating field winding so that the changes in the amount of current flowing in said latter winding are responsive to the changes in the amount of current flowing in the output circuit of said phase detector tube, and feedback means extending between both said phase detector and power tubes to provide said apparatus with a substantially flat characteristic comprising speed versus primary variable.

21. The combination according to claim 20 in which said resonant circuit supplies a transient wave to the input circuit of said phase detector tube, in response to a sudden change in the phase of the pilot wave, so that the phase relation between said transient and pilot waves present simultaneously in the respective input and output circuits of said phase detector tube determines further the amount of space current flowing in the output circuit of said phase detector tube.

22. A speed regulator for an electric motor, comprising means to generate a pilot alternating wave whose frequency is proportional to the speed of said motor, a bridge having a resonant arm tuned to the frequency corresponding to the normal motor speed and further having its input diagonal applied to said wave generating means, a speed governing circuit comprising circuit means operating in response to both an unbalance wave effective at the bridge output diagonal and the pilot wave to cause a correction in the motor speed, means comprising said resonant arm to supply transient electrical energy to said speed governing means in response to a sudden shift in the phase of the generated wave whereby said speed governing means responds to both the transient and pilot waves to effect a further correction in the motor speed, and an independent source to introduce in series with the bridge output diagonal an alternating wave having a predetermined magnitude and a fixed frequency equivalent to the frequency to which said resonant arm is tuned whereby a synchronous relation is maintained between the frequencies of the pilot and independent waves.

23. A speed regulator for dynamo-electric apparatus embodying a regulating field winding, comprising means to produce a pilot wave whose frequency is proportional to the speed of said apparatus, frequency discriminating means connected between said pilot means and said regulating field winding and including a resonant circuit tuned to a certain frequency corresponding to the normal speed of said apparatus to vary the amount of current flowing in said regulating field winding in response to changes in the frequency of the pilot wave due to variations in the apparatus speed, and means comprising said resonant circuit to vary further the amount of current flowing in said regulating field winding when the phase of the pilot wave is suddenly changed.

HUGH M. STOLLER.